United States Patent
Haga et al.

(10) Patent No.: US 6,878,347 B2
(45) Date of Patent: Apr. 12, 2005

(54) EXHAUST GAS PURIFICATION SYSTEM OF INTERNAL COMBUSTION ENGINE

(75) Inventors: Takashi Haga, Wako (JP); Tadashi Satoh, Wako (JP); Hideharu Yamazaki, Wako (JP); Takuji Yamamoto, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 554 days.

(21) Appl. No.: 09/761,711

(22) Filed: Jan. 18, 2001

(65) Prior Publication Data

US 2001/0008616 A1 Jul. 19, 2001

(30) Foreign Application Priority Data

Jan. 19, 2000 (JP) ........................................ 2000-010833

(51) Int. Cl.[7] .............................. F01N 3/00; F02M 25/06
(52) U.S. Cl. ......................... 422/176; 422/234; 60/278; 60/287
(58) Field of Search .............................. 422/234, 168, 422/169, 176; 60/278, 287, 288, 292, 297

(56) References Cited

U.S. PATENT DOCUMENTS

| | | | | |
|---|---|---|---|---|
| 5,676,176 A | * | 10/1997 | Usui ........................... | 138/121 |
| 5,946,906 A | * | 9/1999 | Akazaki et al. ................ | 60/278 |
| 6,256,984 B1 | * | 7/2001 | Voss et al. ..................... | 60/299 |
| 6,280,416 B1 | * | 8/2001 | Van Antwerp et al. ...... | 604/141 |
| 6,367,245 B1 | * | 4/2002 | Yasui et al. .................... | 60/277 |
| 6,477,830 B2 | * | 11/2002 | Takakura et al. ............. | 60/277 |
| 6,729,122 B2 | * | 5/2004 | Watanabe et al. ............. | 60/278 |

FOREIGN PATENT DOCUMENTS

| | | |
|---|---|---|
| JP | 2-275043 | 11/1990 |
| JP | 7-33875 | 8/1995 |
| JP | 8-71427 | 3/1996 |
| JP | 10-148608 | 6/1998 |
| JP | 10-153112 | 6/1998 |
| JP | 10-159544 | 6/1998 |

* cited by examiner

Primary Examiner—Kiley S. Stoner
Assistant Examiner—Len Tran
(74) Attorney, Agent, or Firm—Arent Fox PLLC

(57) ABSTRACT

An exhaust gas purification system of an internal combustion engine having a bypass exhaust gas passage, openable through a switch-over valve, branched from an exhaust pipe at a location downstream of a catalytic converter and again merged into the exhaust pipe at a downstream point, an adsorbent installed in the bypass exhaust gas passage which adsorbs unburned component of the exhaust gas, and an EGR pipe which recirculates the exhaust gas including the unburned components at a location upstream of the catalytic converter, wherein the EGR pipe is made of metal such as stainless steel and is connected to the bypass exhaust gas passage such that the recirculation pipe is brought into thermal contact with the exhaust pipe, thereby enabling to effectively prevent blocking or corrosion of the EGR pipe or switch-over valve from occurring. The inner wall of the recirculation pipe is formed with liquid repellent and oil repellent film so as to overcome moisture-related problems more effectively.

12 Claims, 3 Drawing Sheets

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine.

2. Description of the Related Art

Internal combustion engines are ordinarily provided with a catalytic converter comprising a three-way catalyst in the exhaust system which removes HC, NOx and CO components in the exhaust gas generated by the engine. However, when the catalytic converter is not activated, for example, at the time of engine coldstarting, unburned components of the exhaust gas including unburned HC are released immediately into the atmosphere.

For that reason, as taught by Japanese Laid-Open Patent Application No. 10 (1998)-153112, there has been proposed an exhaust gas purification system which has an adsorbent made of a zeolite material or some similar material installed in a bypass exhaust gas passage branched from the exhaust pipe at a location downstream of the catalytic converter, which again merges into the exhaust pipe at a downstream point and has a switch-over valve which opens or closes the bypass exhaust gas passage. The switch-over valve opens the bypass exhaust gas passage when the catalytic converter has not been activated at cold engine start to introduce the exhaust gas such that the adsorbent adsorbs unburned components and closes the bypass exhaust gas passage such that the adsorbent desorbs the adsorbed components. The desorbed components are thereafter recirculated at a position upstream of the catalytic converter, e.g. to the air intake system, through a recirculation pipe after the catalytic converter has been activated.

In this kind of exhaust gas purification system, when the recirculation pipe is configured to connect the bypass exhaust gas passage to the air intake system, since the recirculation pipe becomes relatively long, gas in the pipe may sometimes condense into liquid water due to the ambient temperature and remain in the pipe. If this happens, the residual water could freeze to block the pipe or could corrode the pipe or the switch-over valve.

SUMMARY OF THE INVENTION

An object of the invention is therefore to provide an exhaust gas purification system of an internal combustion engine having a recirculation pipe that recirculates unburned exhaust gas components adsorbed at an adsorbent installed in a bypass exhaust gas passage openable through a switch-over value when a catalytic converter has not been activated, at a location upstream of the catalytic converter, which can effectively prevent blocking or corrosion of the recirculation pipe or switch-over valve due to the condensation of the recirculated gas from occurring.

In order to achieve the object, there is provided a system for purifying exhaust gas of an internal combustion engine having a bypass exhaust gas passage, openable through a switch-over valve, branched from an exhaust pipe at a location downstream of a catalytic converter and merged into the exhaust pipe at a downstream point, an adsorbent installed in the bypass exhaust gas passage which adsorbs unburned components of the exhaust gas, and a recirculation pipe which recirculates the exhaust gas including the unburned components at a location upstream of the catalytic converter, wherein the improvement comprises the recirculation pipe is made of metal and is connected to the bypass exhaust gas passage close to the exhaust pipe such that the recirculation pipe is brought into thermal contact with the exhaust pipe.

BRIEF EXPLANATION OF THE DRAWINGS

The objects and advantages of the invention will be made apparent with reference to the following descriptions and drawings, in which.

PREFERRED EMBODIMENTS OF THE INVENTION

Embodiments of the invention will now be explained with reference to the drawings.

Figure 1:
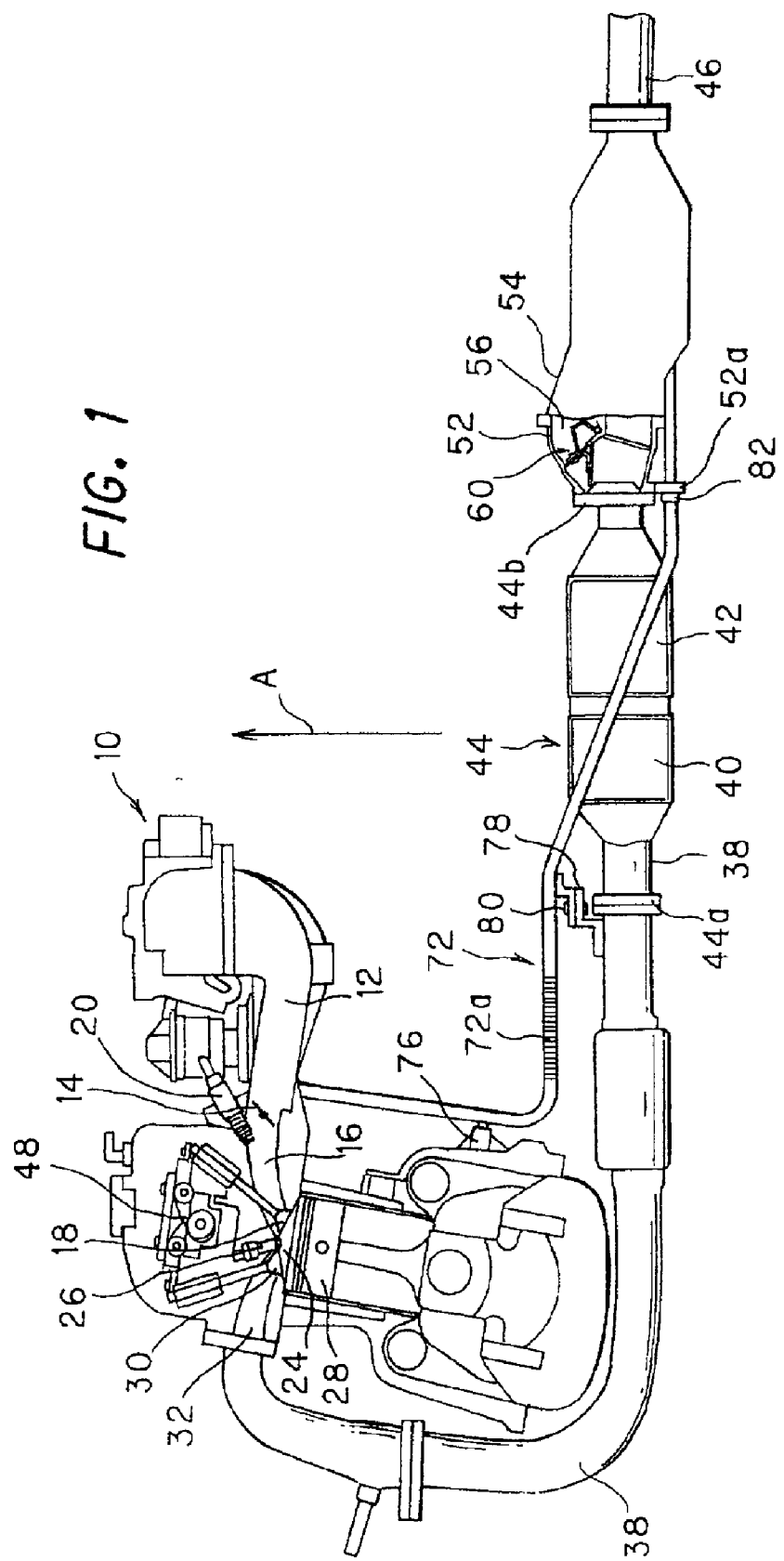
FIG. 1 is a schematic side view showing the overall configuration of an exhaust gas purification system of an internal combustion engine according to a first embodiment of the invention.

FIG. 1 is a view schematically showing the overall configuration of an exhaust gas purification system of an internal combustion engine according to an embodiment of the invention. In FIG. 1, the arrow A indicates the axis of gravity.

Reference numeral 10 in this figure designates an overhead cam (OHC) in-line four-cylinder internal combustion engine. Air drawn into an air intake pipe or passage 12 through an air cleaner (not shown) is adjusted in its flow rate by a throttle valve 14 and is supplied to the first to fourth cylinders (only one is shown) through an intake manifold 16 and two intake valves 18 (only one is shown).

A fuel injector 20 is installed in the vicinity of the intake valves 18 of each cylinder for injecting fuel into the cylinder concerned. The injected fuel mixes with the intake air to form an air-fuel mixture that is supplied into a combustion chamber 24 and is compressed in the compression stroke. The compressed air-fuel mixture is then ignited by a spark plug 26. The resulting combustion of the air-fuel mixture drives a piston 28 downwards in the figure.

The exhaust gas generated by the combustion is discharged through two exhaust valves 30 (only one is shown) into an exhaust manifold 32, from where it passes through an exhaust pipe or passage 38 to a first three-way catalyst bed and a second three-way catalyst bed 42. The first and second three-way catalyst beds 40 and 42 are installed below the floor of vehicle (not shown) on which the engine 10 is mounted and constitute a catalytic converter 44 where noxious components in the exhaust gas are removed therefrom whereafter the exhaust gas discharged into the atmosphere via a vehicle rear assembly 46 including a muffler and a tail pipe (neither shown).

The engine 10 is equipped with a variable valve timing mechanism 48, which switches the opening/closing timing of the intake and/or exhaust valves between two types of timing characteristics in response to the engine operating conditions. However, since its operation is described in, for example, Japanese Laid-Open Patent Application 2 (1990)-275043, no further explanation will be made.

The exhaust pipe 38 is branched off downstream of the catalytic converter 44 to form a branch 52. The branch 52 is connected to a chamber 54, in a cylindrical shape, which is made of metal and is air-tightly connected to the exhaust pipe 38 so as to surround the same. With this, two passages for exhaust gas flow are formed, comprising a main exhaust gas passage 38a (shown in FIG. 2) passing through the inside of the exhaust pipe 38 and a bypass exhaust gas passage 56 passing through the branch 52 and the inside space of the chamber 54. The combustion gas exhausted from the combustion chamber 24 flows through one of the two exhaust gas passages 38a and 56. A switch-over valve 60 is provided in the vicinity of the branching point at the entrance of the chamber 54.

Figure 2:
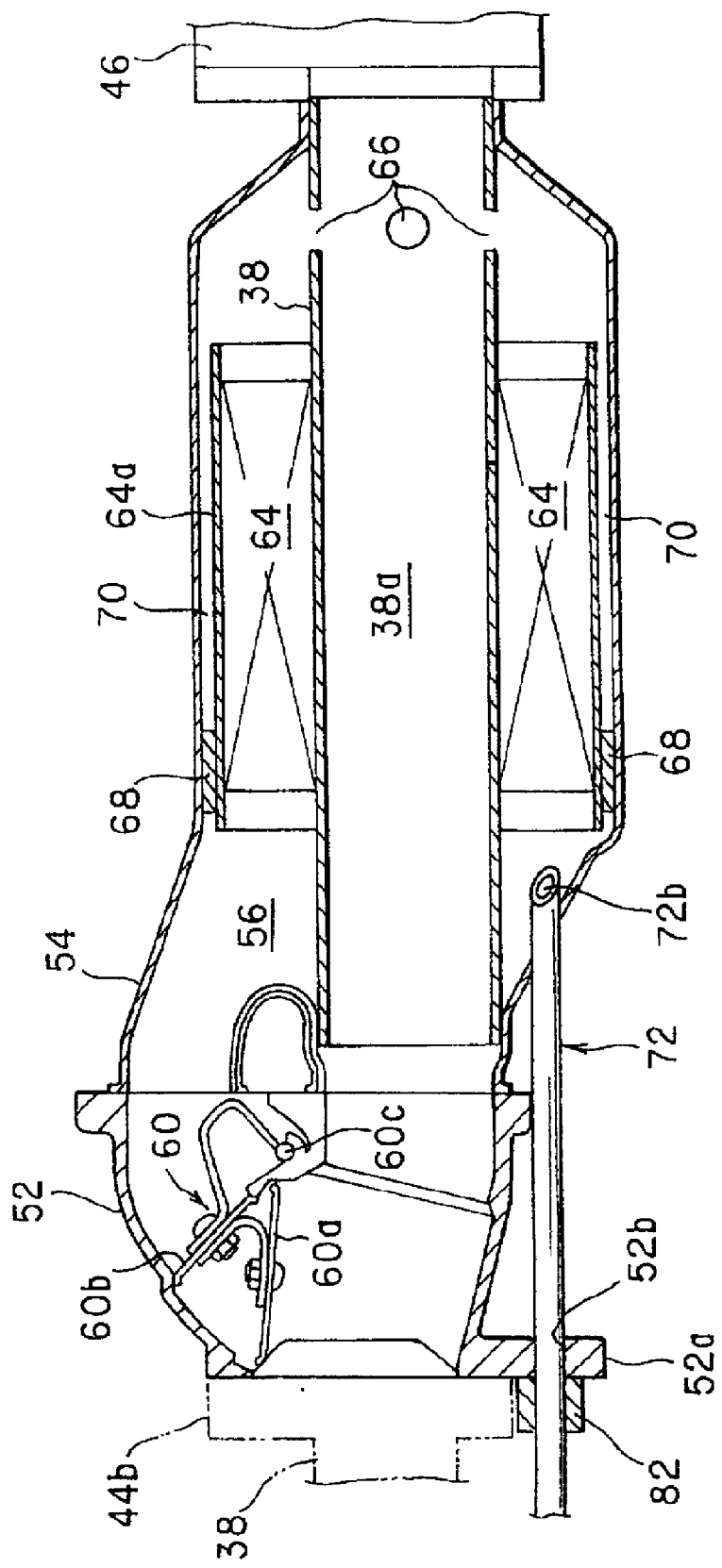
FIG. 2 is an enlarged explanatory sectional view of a chamber defining a bypass exhaust gas passage and a switch-over valve illustrated in FIG. 1.

FIG. 2 is an enlarged sectional view of the chamber 54 (defining the bypass exhaust gas passage 56) and the switch-over valve 60.

As shown in FIG. 2, the switch-over valve 60 comprises a first valve disc 60a whose diameter is greater than the exhaust pipe inner wall defining the main exhaust gas passage 38a and a second valve disc 60b (connected by an arm in inverted-C shape with the first valve disc 60a) whose diameter is greater than the diameter of the inner wall of the branch 52 partially defining the bypass exhaust gas passage 56.

As illustrated, the second valve disc 60b is connected to a shaft 60c through a stem. The shaft 60c is connected to a valve actuator (not shown) which is connected to the air intake pipe 12 at a location downstream of the throttle valve 14, through a pipe (not shown) for introducing the negative pressure therefrom. An electromagnetic solenoid valve (referred later as "TRPV", but not shown) is installed in the pipe, which opens the pipe, when energized, to introduce the negative pressure therein. With this, the valve disc 60a is moved or rotated from the position shown in the figure to close the main exhaust gas passage 38a. On the other hand, when the TRPV is deenergized and the pipe is opened to the air, the valve disc 60b is returned to the position shown in the figure by a return spring (not shown) to close the bypass exhaust gas passage 56.

An adsorbent (HC adsorbing catalyst) 64 is installed at the bypass exhaust gas passage 56 in the chamber 54. Specifically, the chamber 54 is configured to be cylindrical in cross section as mentioned above such that it completely encircles the exhaust pipe 38. Similarly, the adsorbent 64 is in the same shape and is housed in the chamber in such a manner that the outer surface is covered by an outer tube 64a in a cylindrical shape and made of stainless steel, while the inner surface is in contact with the exhaust pipe 38.

Thus, the chamber 54 houses the adsorbent 64 in such a manner that the adsorbent 64 is in thermal contact with the exhaust pipe 38 to promote the adsorbent temperature increase such that the adsorbed unburned components are desorbed as quickly as possible and are then recirculated into the engine intake system.

The adsorbent 64 comprises a mixture of crystalline aluminosilicate (e.g. ZSM-5 zeolite) and a catalyzer element (as described in Japanese Laid-Open Patent Application No. Hei 8 (1996)-71427 proposed by the assignee) which is carried on a honeycomb structure made of a spiral thin metal plate as taught in Japanese Utility Model Publication Hei 7 (1995)-33875.

The adsorbent 64 made from any kind of the crystalline aluminosilicate exhibits an excellent heat proof (thermal stability) property at a high temperature of 900° C. to 1000° C., compared with active carbon. The adsorbent 64 adsorbs unburned HC components at a low temperature less than 100° C. and desorbs the adsorbed HC component at a higher temperature ranging from 100° C. to 250° C. The temperature of adsorption or desorption is different for different kinds of the adsorbent.

The exhaust pipe 38 is provided near the end of the chamber 54 (close to the vehicle rear assembly 46) with four holes (confluence points) 66 which are circumferentially located at intervals of 90 degrees. The bypass exhaust gas passage 56 is thus formed from the branch 52 and extends into chamber 54 via the adsorbent 74 up to the holes 66 at the downstream point where it merges into the main exhaust gas passage 38a in the exhaust pipe 38.

A sealing member 68 is installed between the inner wall of the chamber 54 and the adsorbent 64 (more precisely the outer tube 64a of the adsorbent 64) at one end (at an upstream position close to the branch 52) to block a space defined therebetween. The space is opened at the other end (close to the vehicle rear assembly 46 to communicate with the exhaust pipe 38 so as to introduce part of the exhaust gas at a high temperature such that a heat insulating layer 70 is formed there. As the sealing member, a material exhibiting excellent thermal stability, sealing and heat insulation should be used. For example, a material (made of textile made of alumina and silica) and vermiculite which are bound by a binder should be used.

The chamber 54 is installed outside of the vehicle body at the position underneath the vehicle floor and is exposed to the atmosphere. Accordingly, the adsorbent 64 housed in the chamber 54 is cooled by the wind when the vehicle runs. It is also cooled when the atmospheric temperature drops. However, since the heat insulating layer 70 is formed to invite the exhaust gas at a high temperature therein, this can effectively insulate the adsorbent 64.

Returning to the explanation of FIG. 1, the chamber 54 is connected, at or near the entrance (at a position close to the branch 52) to an EGR (Exhaust Gas Recirculation) pipe 72. The EGR pipe 72 is connected, at the other end, to the air intake pipe 12 at a position downstream of the throttle valve 14. The EGR pipe 72 is provided with an EGR control valve (electromagnetic solenoid valve, not shown) which closes the pipe 72 when made ON (energized).

Since the gist of the invention mainly resides in the configuration of the EGR pipe 72, etc., the embodiment will be explained with focus thereon.

As illustrated in FIG. 1, the EGR pipe 72 is configured to descend substantially vertically from the air intake pipe 12, bends at substantially right angle and extends rearward (relative to the vehicle) close to the exhaust pipe 38, in other words, it is brought into thermal contact with the exhaust pipe 38.

The EGR pipe 72 is fastened to the body of the engine 10 by a support 76 projecting from the cylinder case and is fastened to the exhaust pipe 38 by a stay 78. The stay 78 comprises two metal plates in L-shape (when viewed from the side as illustrated) which are detachably fastened together by a combination of bolt and nut 80. The stay 78 and the support 76 are made of metal such as stainless steel material having excellent heat transfer properties.

The EGR pipe 72 has a corrugated portion 72a at its midway, more precisely at a position just upstream of the bending portion (in terms of gas flow), which allows the EGR pipe 72 to expand or contact in response to the expansion or contraction of the exhaust pipe 38 due to the exhaust gas heat.

Continuing the explanation of the EGR pipe 72, it descends gradually or evenly, passing the side of the catalytic converter 44, from the position fixed to the exhaust pipe 38 towards the chamber 54 and is finally connected to the chamber at a relatively lower portion (in terms of the axis of gravity A). The EGR pipe 72 is thus configured to have no portion which once ascends and then descends. In other words, the EGR pipe 72 comprises a vertically descending portion, a gradually descending portion and a flat portion, relative to the axis of gravity, such that it excludes any portion that may collect liquid.

As illustrated in FIG. 2, the branch 52 is provided with a flange 52a (at the side close to the catalytic converter 44) and the EGR pipe 72 passes through a hole 52b penetrating through the flange 52a and penetrates the chamber 54 to be opened in the chamber 54. Reference numeral 82 indicates a nut for fixing the EGR pipe 72 to the flange 52a. Although not shown, the EGR pipe 72 is fixed to the air intake pipe 12 at the opposite end in a similar manner. Thus, the EGR pipe 72 is detachably fastened to the body of the engine 10 and the chamber 54 through the nuts 82 and the combination of bolt and nut 80, etc.

The EGR pipe 72 is made of metal such as stainless steel and its inner wall 72b (shown in FIG. 2) is coated with a material of organosilicon compound such as fluoroalkylsilan to form a film of water repellent and oil repellent thereon. More precisely, the inner wall 72b of the EGR pipe 72 is formed with the water and oil repellent film of the material of organosilicon compound expressed by the general formula $Rf—R^1—Si(NH)_{3/2}$, wherein Rf indicates perfluoroalkyl group in the number of carbon of 1 to 10, and $R^1$ indicates hydrocarbon radical in the number of carbons of 2 to 10. Since the technique to form such a film is described in Japanese Laid-Open Patent Application No. Hei 10 (1998)-148608 proposed by the assignee, no further explanation will be made.

As illustrated in FIG. 2, the flange 52a is fastened to the catalytic converter 44 at its upper or innermost portion (viewed in the figure). In other words, as illustrated in FIG. 1, flanges 44a (shown in FIG. 1) and 44b are formed at the upstream and downstream ends of the portion of the exhaust pipe 38 housing the catalytic converter 44. More specifically, the exhaust pipe portion is connected to the upstream end of the exhaust pipe 38 through the upstream flange 44a by bolts and nuts (not shown) and to the flange 52a of the branch 52 through the downstream flange 44b by bolts and nuts (not shown). Thus, the catalytic converter 44 is detachably fastened to the exhaust pipe 38, also.

Having been configured in the foregoing manner, in the system according to this embodiment, since the EGR pipe 72 is installed close to the exhaust pipe 38 and is brought into thermal contact therewith, the heat of the exhaust gas flowing in the exhaust pipe 38 is surely transferred to the EGR pipe 72 to heat the same, which can effectively prevent the recirculated gas including the desorbed unburned components in the EGR pipe 72 from being condensed.

Further, since the EGR pipe 72 is configured to have no portion which once ascends then descends, in other words, since the EGR pipe 72 is configured to have no depression that may collect liquid in the passage between the engine 10 and the chamber 54, even if the recirculated gas in the EGR pipe 72 is condensed and liquidized, the liquid must surely be returned to the chamber 54. With this, the liquid will not corrode the EGR pipe 72 or the switch-over valve 60 and will not block the EGR pipe 72. In addition, since the inner wall 72b of the EGR pipe 72 is formed with the water repellent and oil repellent film, even if the recirculated gas is condensed and liquidized, it can flow as a droplet and will not remain in the EGR pipe 72.

Furthermore, since the EGR pipe 72 is fastened to the body of the engine 10 by the support 76 made of a metallic material having an excellent heat transfer property and is fastened to the exhaust pipe 38 by the stay 78 made of the same material, the heat from the engine 10 and the exhaust pipe 38 can be transferred to the EGR pipe 72 more effectively.

Furthermore, since the EGR pipe 72 is configured to be connected to the lower portion of the chamber 54, this can make the layout compact. And, since the EGR 72 and the catalytic converter 44 are configured to be easily detachable from the exhaust pipe 38, they can be exchanged with replacements in a simple manner.

Figure 3:
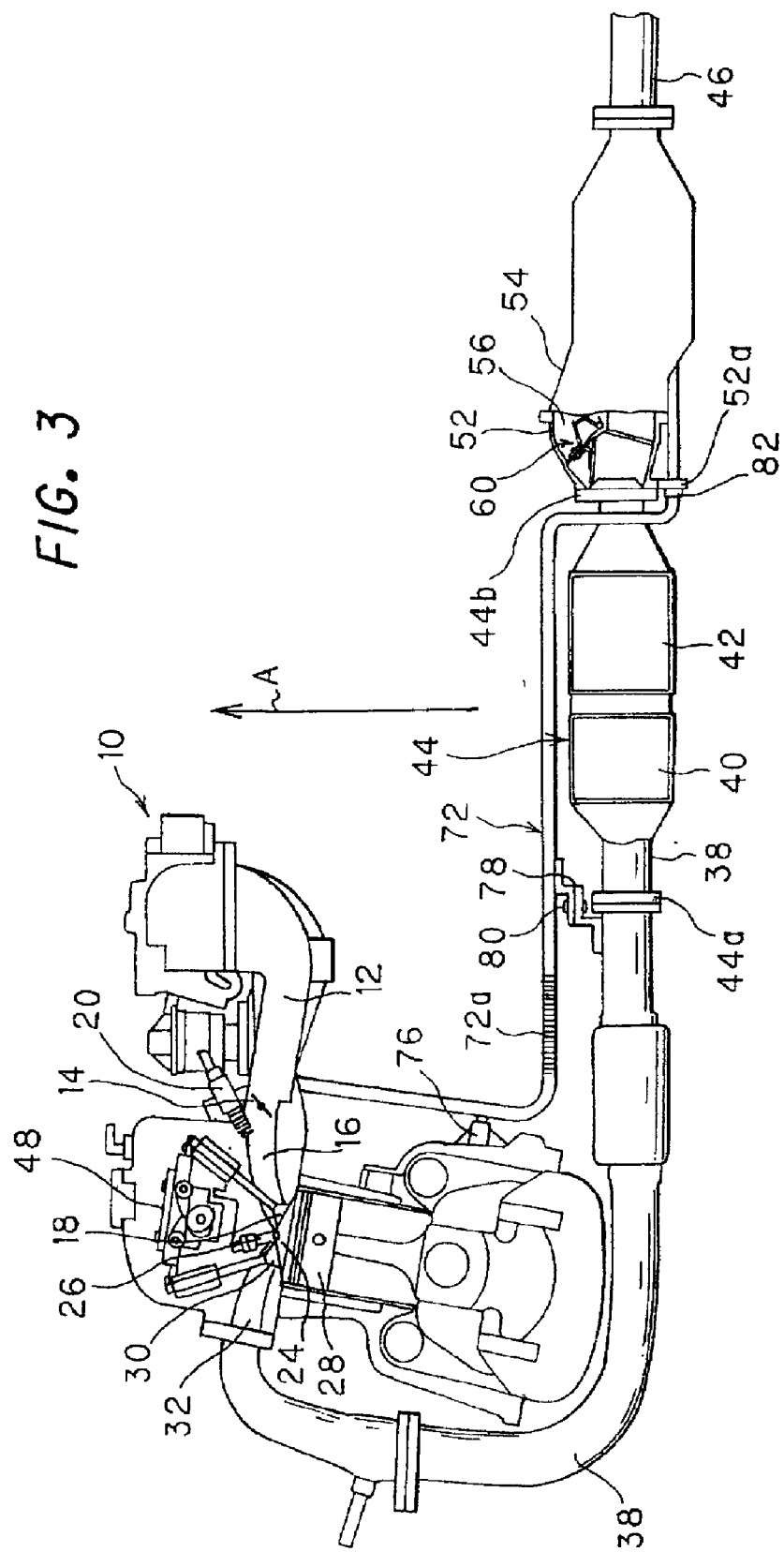
FIG. 3 is a view, similar to FIG. 1, but showing the overall configuration of an exhaust gas purification system of an internal combustion engine according to a second embodiment of the invention.

FIG. 3 is a view, similar to FIG. 1, but showing the overall configuration of an exhaust gas purification system of an internal combustion engine according to a second embodiment of the invention.

Explaining this with focus on the differences from the first embodiment, the EGR pipe 72 is configured to descend substantially vertically from the air intake pipe 12, then bends at substantially right angle and extends rearward close to the exhaust pipe 38 (in thermal contact with the exhaust pipe 38), while passing above the catalytic converter 44. Then, it again bends at substantially right, then descends vertically and is finally connected to the chamber 54 at the relatively lower portion.

More specifically, of the EGR pipe 72 in the second embodiment, the portion which descends gradually or evenly is removed. In other words, the EGR pipe 72 comprises a vertically descending portion and a flat portion, relative to the axis of gravity, such that it exclude any portion that may collect liquid. The rest of the configuration is the same as that of the first embodiment.

Having been configured in the foregoing manner, in the system according to the second embodiment, since the EGR pipe 72 is also brought into thermal contact with the exhaust pipe 38, the heat of the exhaust gas flowing in the exhaust pipe 38 is surely transferred to the EGR pipe 72 to heat the same, which can effectively prevent the recirculated gas including the desorbed unburned components in the EGR pipe 72 from being condensed.

Further, since the EGR pipe 72 is similarly configured to have no portion which once rises upwards, but then drops downwards, in other words, since the EGR pipe 72 is configured to have no depression that may collect liquid in the passage between the engine 10 and the chamber 54, even if the recirculated gas in the EGR pipe 72 is condensed and liquidized, the liquid must be surely returned to the chamber 54. With this, the liquid will not corrode the EGR pipe 72 or the switch-over valve 60 and will not block the EGR pipe 72. In addition, since the inner wall 72b of the EGR pipe 72 is formed with the water repellent and oil repellent film, even if the recirculated gas is condensed and liquidized, it can flow as a droplet and will not remain in the EGR pipe 72.

The first and second embodiments are thus configured to have a system for purifying exhaust gas of an internal combustion engine 10 having a bypass exhaust gas passage 56, openable through a switch-over valve 60, branched from an exhaust pipe 38 at a location downstream of a catalytic converter 44 and merged into the exhaust pipe at a downstream point, an adsorbent 64 installed in the bypass exhaust gas passage which adsorbs unburned components of the exhaust gas, and a recirculation pipe (EGR pipe 72) which recirculates the exhaust gas including the unburned components at a location upstream of the catalytic converter, wherein the improvement comprises: the recirculation pipe is made of metal and is connected to the bypass exhaust gas passage close to the exhaust pipe such that the recirculation pipe is brought into thermal contact with the exhaust pipe.

In the system, an inner wall 72b of the recirculation pipe is formed with liquid repellent and oil repellent film.

In the system, the recirculation pipe is connected to an air intake system (air intake pipe 12) of the engine at one end and is connected to a chamber 54), at the other end, which defines the bypass exhaust gas passage and the recirculation pipe comprises a descending portion and a flat portion relative to an axis of gravity such that it excludes a portion that may collect liquid.

In the system, the recirculation pipe is fastened to a body of the engine by a support 76 made of metal and is fastened to the exhaust pipe by a stay 78 made of metal.

In the system, the recirculation pipe has a corrugated portion 72a which allows the recirculation pipe to expands or contact in response to expansion or contraction of the exhaust pipe due to exhaust gas heat.

In the system, the adsorbent is installed in a chamber 54 defining the bypass exhaust gas passage with a space (heat insulating layer) therebetween such that the exhaust gas is introduced in the space.

It should be noted in the above that, although the EGR pipe 72 is made of metal, it may not always be fully made of metal. Specifically, a portion to be jointed to the flange 52a may made of a non-metallic material such as rubber.

It should also be noted in the above that, although stainless steel is mentioned as the material for fabricating the EGR pipe 72, other material may instead be used if it exhibits excellent heat transfer and corrosion resistance.

It should also be noted that, although the bypass exhaust gas passage is configured to have the switch-over valve 60 and the connecting point of the EGR pipe 72 at the upstream side (close to the branch 52), the bypass exhaust gas passage should not be limited to the type disclosed. It is alternatively possible to have the switch-over valve 60 and the connecting point of the EGR pipe 72 at the downstream side (close to the vehicle rear assembly 46), as disclosed in Japanese Laid-Open Patent Application No. Hei 10 (1998)-159544.

While the invention has thus been shown and described with reference to specific embodiments, it should be noted that the invention is in no way limited to the details of the described arrangements; changes and modifications may be made without departing from the scope of the appended claims.

What is claimed is:

1. A system for purifying exhaust gas of an internal combustion engine having a bypass exhaust gas passage, openable through a switch-over valve, branched from an exhaust pipe at a location downstream of a catalytic converter and merged into the exhaust pipe at a downstream point, an adsorbent installed in the bypass exhaust gas passage which adsorbs unburned components of the exhaust gas, and a recirculation pipe which recirculates the exhaust gas including the unburned components at a location upstream of the catalytic converter, wherein the recirculation pipe is made of metal, is connected to the bypass exhaust gas passage at a lowest point of the recirculation pipe relative to an axis of gravity and close to the exhaust pipe, and is in thermal contact with the exhaust pipe.

2. A system for purifying exhaust gas of an internal combustion engine having a bypass exhaust gas passage, openable through a switch-over valve, branched from an exhaust pipe at a location downstream of a catalytic converter and merged into the exhaust pipe at a downstream point, an adsorbent installed in the bypass exhaust gas passage which adsorbs unburned components of the exhaust gas, and a recirculation pipe which recirculates the exhaust gas including the unburned components at a location upstream of the catalytic converter, wherein the recirculation pipe is made of metal and in thermal contact with the exhaust pipe, and wherein an inner wall of the recirculation pipe is formed with liquid repellent and oil repellent film.

3. A system according to claim 1, wherein the recirculation pipe is connected to an air intake system of the engine at one end and is connected to a chamber, at the other end, which defines the bypass exhaust gas passage and the recirculation pipe comprises a descending portion and a flat portion relative to the axis of gravity, wherein the recirculation pipe excludes a portion that may collect liquid.

4. A system according to claim 2, wherein the recirculation pipe is connected to an air intake system of the engine at one end and is connected to a chamber, at the other end, which defines the bypass exhaust gas passage and the recirculation pipe comprises a descending portion and a flat portion relative to the axis of gravity, wherein the recirculation pipe excludes a portion that may collect liquid.

5. A system according to claim 1, wherein the recirculation pipe is fastened to a body of the engine by a support made of metal.

6. A system according to claim 1, wherein the recirculation pipe is fastened to the exhaust pipe by a stay made of metal.

7. A system according to claim 1, wherein the recirculation pipe has a corrugated portion which allows the recirculation pipe to expand or contract in response to expansion or contraction of the exhaust pipe due to exhaust gas heat.

8. A system according to claim 2, wherein the recirculation pipe has a corrugated portion which allows the recirculation pipe to expand or contract in response to expansion or contraction of the exhaust pipe due to exhaust gas heat.

9. A system according to claim 1, wherein the adsorbent is installed in a chamber defining the bypass exhaust gas passage with a space therebetween, and wherein the exhaust gas is introduced in the space.

10. A system according to claim 2, wherein the recirculation pipe is fastened to a body of the engine by a metal support.

11. A system according to claim 2, wherein the recirculation pipe is fastened to the exhaust pipe by a metal stay.

12. A system according to claim 2, wherein the adsorbent is installed in a chamber defining the bypass exhaust gas passage with a space therebetween and wherein the exhaust gas is introduced in the space.

* * * * *